Figure 1:
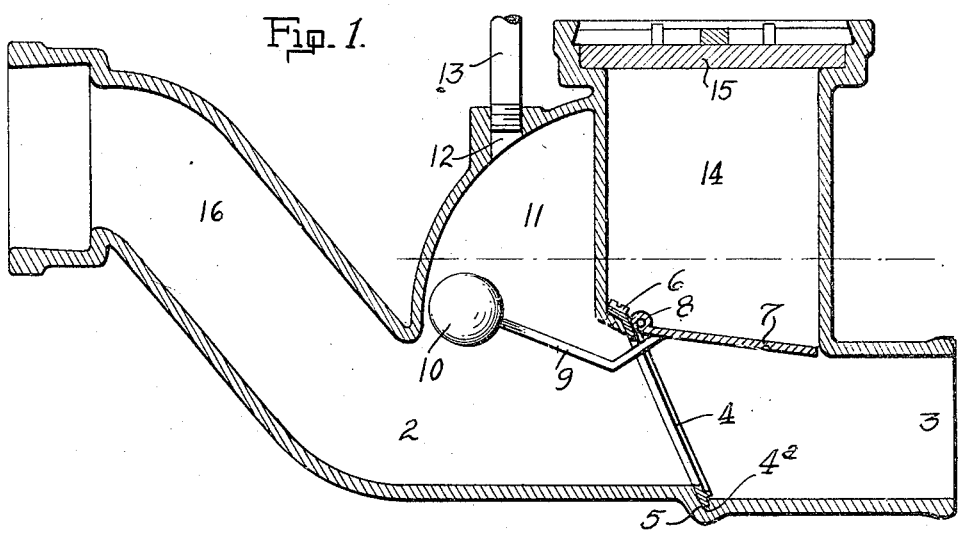

E. T. HEALY.
BACKWATER VALVE.
APPLICATION FILED DEC. 4, 1915.

1,205,199.

Patented Nov. 21, 1916.

Witness
Oscar V. Payne

Inventor,
EDMUND T. HEALY,
By Knight Bro.
Attorneys.

UNITED STATES PATENT OFFICE.

EDMUND T. HEALY, OF ST. PAUL, MINNESOTA.

BACKWATER-VALVE.

1,205,199.  Specification of Letters Patent.  Patented Nov. 21, 1916.

Application filed December 4, 1915. Serial No. 65,072.

*To all whom it may concern:*

Be it known that I, EDMUND T. HEALY, a citizen of the United States, residing at St. Paul, in the county of Ramsey and State of Minnesota, have invented certain new and useful Improvements in Backwater-Valves, of which the following is a specification.

This invention relates to a valve for a drainage or other pipe adapted to prevent flow of water backward therethrough, and has for its object to provide a valve and fittings therefor of simple construction, cheap to produce, durable in service, readily accessible for needed repair, and withal very efficient in service.

One characteristic of the invention consists in having the valve and a controlling float above and out of the water flow during normal conditions, but promptly moving and causing the valve to seat with the back flow pressure whenever the water develops an abnormal level in the valve housing, to which end, the invention embodies an approximately horizontal valve chamber through which the normal flow of water takes place, with the valve seat located in a plane intersecting the water channel of said housing and a valve provided with a pintle mounting in the upper portion of the valve housing and having a counter-balance and float connected with the valve in a manner to hold it normally elevated from its seat by the gravitation of the counter-weight under normal conditions, but depressing the valve toward its seat by the rising of the float under an abnormal water level. In realizing this characteristic of the invention, the counter-balance and float are preferably one and the same structure connected with the valve through a lever arm and forming with the valve, a lever of the first order with the fulcruming pintle located intermediately thereof, and with the center of gravity sufficiently below the pintle to develop a suspension which will permit the structure to rest in substantially horizontal position, or parallel with the normal flow of water above which it is located; and the valve seat is preferably a separate structure positioned by means of a recess in the bottom of the water channel, bolted at top to prevent displacement and carrying on its out-flow side, the bearing for the valve pintle.

Another characteristic consists in providing a suitably vented float chamber in which the float may rise when necessary, and a suitably closed hand-hold through which to gain access to the valve in case of need; to which end, further features of the invention consist in providing, preferably as an integral part of the valve housing, a float chamber that communicates with and extends vertically from the valve housing in position over the float, and a hand passage with a removable cover communicating with and extending upwardly from the valve housing, over the valve. In the preferred realization of these features, the float chamber and hand passage have one wall in common, which terminates at the intersection with the water channel and provides the anchorage or bolting wall for the valve seat, so that the valve may lie beneath its lower end in position to present the valve proper and the combined counter-poise and float in their proper positions.

The invention will be fully understood upon reference to the accompanying drawing, in which—

Figure 2:
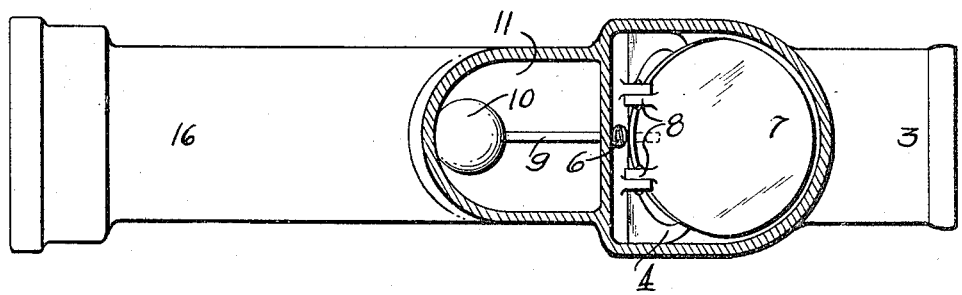
Figure 3:
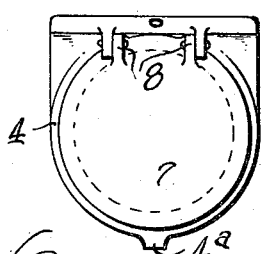
Figure 4:
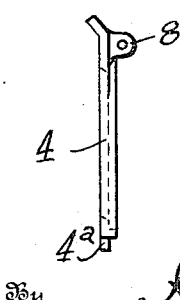

Figure 1 is a vertical sectional view of the preferred embodiment of the complete device. Fig. 2 is a horizontal section of the same, and Figs. 3 and 4 are, respectively, a front view and an edge view of the removable valve seat.

1 represents the water channel of the valve housing having an intake 2 and a discharge opening 3, and 4 represents a valve seat fitting the interior of said water channel, and having at bottom, the lug 4$^a$ fitting in the recess 5 of the water channel and secured at 6 by a bolt, rivet, or other suitable anchoring means, to prevent its displacement from said recess.

7 represents the valve secured by a pintle 8 at the upper end of the valve seat 4, and 9 represents a lever arm rigidly secured to the valve 7 and carrying at its rear end, a float 10 having sufficient buoyancy to swing the valve 7 toward its seat 4 when water rises around the float, but adapted to serve as a counter-poise and hold the valve in the elevated position as shown in Fig. 1, so long as the water level remains within the limits of the water channel.

In order that the float 1 may rise under an accumulation of water due to a back flow through the discharge opening 3, a float chamber 11 communicating with the water channel 1 extends upwardly over the float 10 and is provided with a vent 12 adapted to communicate through a pipe 13 with the ordinary ventilator pipe usually found in plumbing systems. To give access to the valve 7 and also to the valve seat 4 in order that the latter, together with the valve, may be removed for adjustment or repair, a hand passage 14 is erected over the valve 7 and in communication with the water channel 1, and is closed at its upper end by the removable cover 15 of any approved form. With this construction, cover 15 may be removed and the hand introduced through the passage 14 to release the bolt or other fastening 6 when the valve seat 4 and the pivotally attached valve with its combined float and counter-weight may be removed for adjustment or repair, and thereafter replaced and secured by again inserting the bolt 6.

In some situations, it will be desirable to provide an upwardly inclined offset 16 at the intake end of the valve housing in order to insure backing up of the water in the float chamber 11. In other situations, however, the trap or valve may be located in proximity to an existing down-take in the drainage system which will render the offset 16 unnecessary, and in that event, an ordinary flange coupling will be provided immediately adjacent the intake end 2 of the valve housing.

As shown in Figs. 3 and 4, the valve seat 4 and the corresponding portion of the water channel are provided with parallel sides and a horizontal top, the valve seat being made to fit snugly the internal form of the valve housing, and the positioning lug 4$^a$ which projects beyond the seating rim 4$^b$ being located at bottom and taking into a corresponding depression in the housing.

From the foregoing description, it will be seen that the valve will normally assume the approximately horizontal position shown in Fig. 1 and there remain until water rises in the float chamber 11 and lifts the float, whereupon the valve will move toward its seat and firmly rest against the same under the back pressure. But there is no operation or working of the valve back and forth under the ordinary service of the trap, and consequently there is no wear and tear upon the parts, except under the rare emergency when the valve is called into play to resist back flow.

I claim:—

1. A back-flow valve comprising a suitable housing having a water channel therethrough, and a valve seat intersecting said water channel, and a valve and float mounted in said housing and both normally above the normal water flow through said channel; said housing being constructed with a vented float chamber, and a second and independent hand passage extending upwardly over the valve.

2. A back-flow valve comprising a suitable housing having a water channel therethrough, and a valve seat intersecting said water channel, and a valve and float mounted in said housing and both normally above the normal water flow through said channel; said housing being constructed with a float chamber and a hand passage extending upwardly over the float and valve, respectively; said float chamber and hand passage having a common dividing wall which terminates at their intersection with the water passage, and said wall receiving the anchoring screw for the valve seat.

The foregoing specification signed at St. Paul, Minnesota, this 2nd day of December, 1915.

EDMUND T. HEALY.

Copies of this patent may be obtained for five cents each, by addressing the "Commissioner of Patents, Washington, D. C."